United States Patent
Syed et al.

(10) Patent No.: US 6,806,319 B2
(45) Date of Patent: Oct. 19, 2004

(54) RETARDING THE THERMAL DEGRADATION OF POLYMERS USING UNSATURATED ALIPHATIC COMPOUNDS

(75) Inventors: Abuzar Syed, Bear, DE (US); Lester P. J. Burton, Avondale, PA (US)

(73) Assignee: Basell Polioelfine Italia S.p.A., Milan (IT)

( * ) Notice: Subject to any disclaimer, the term of this patent is extended or adjusted under 35 U.S.C. 154(b) by 286 days.

(21) Appl. No.: 09/924,252

(22) Filed: Aug. 8, 2001

(65) Prior Publication Data

US 2003/0125436 A1 Jul. 3, 2003

(51) Int. Cl.$^7$ .......................... C08F 8/00; C08G 63/48; C08G 63/91; C08L 51/06; C08K 5/103
(52) U.S. Cl. .................. 525/326.1; 525/69; 525/86; 524/251; 524/320; 524/504; 524/525
(58) Field of Search ................ 524/251, 320, 524/504, 525; 525/69, 86, 326.1

(56) References Cited

U.S. PATENT DOCUMENTS

| | | | |
|---|---|---|---|
| 3,144,422 A | 8/1964 | Homberg | 260/23 |
| 4,032,481 A * | 6/1977 | Pillar | 521/56 |
| 4,042,549 A | 8/1977 | Ahr et al. | 260/23 XA |
| 4,191,670 A | 3/1980 | Strauch et al. | 260/23 AR |
| 4,469,829 A * | 9/1984 | Konietzny et al. | 524/103 |
| 4,668,721 A | 5/1987 | Seltzer et al. | 524/95 |
| 4,686,148 A | 8/1987 | Havens | 428/520 |
| 4,876,300 A | 10/1989 | Seltzer et al. | 524/100 |
| 5,077,328 A | 12/1991 | Haruna et al. | 524/100 |
| 5,140,074 A | 8/1992 | DeNicola, Jr. et al. | 525/263 |
| 5,212,246 A | 5/1993 | Ogale | 525/240 |
| 5,229,456 A | 7/1993 | Ilenda et al. | 525/66 |
| 5,286,791 A | 2/1994 | DeNicola, Jr. et al. | 525/71 |
| 5,302,454 A | 4/1994 | Cecchin et al. | 428/402 |
| 5,319,012 A | 6/1994 | Ward et al. | 524/321 |
| 5,409,992 A | 4/1995 | Eppert, Jr. | 525/88 |
| 5,411,994 A | 5/1995 | Galli et al. | 521/50.5 |
| 5,599,768 A | 2/1997 | Hermansky | 504/116 |
| 5,759,702 A | 6/1998 | Bekele | 428/518 |
| 5,859,104 A | 1/1999 | Becker | 524/236 |
| 5,914,194 A | 6/1999 | Bekele | 428/518 |
| 5,919,871 A | 7/1999 | Nicol et al. | 525/333.8 |
| 6,017,986 A * | 1/2000 | Burton | 524/313 |
| 6,046,273 A * | 4/2000 | Syed | 525/71 |
| 6,107,377 A * | 8/2000 | Nakamura et al. | 524/153 |
| 6,255,448 B1 | 7/2001 | Grimaldi et al. | 528/398 |

FOREIGN PATENT DOCUMENTS

| | | |
|---|---|---|
| EP | 0726289 | 8/1996 |
| WO | 9813402 | 4/1998 |
| WO | 0008078 | 2/2000 |

OTHER PUBLICATIONS

M. Nishimoto et al., Polymer, 32: 7, p. 1274–1283 (1991).

* cited by examiner

Primary Examiner—Tae H. Yoon

(57) ABSTRACT

The thermal stability of a polymer is improved by blending, before melt processing, (1) a polymer selected from (a) olefin polymers, (b) polymers of vinyl-substituted aromatic compounds, (c) polymers of substituted acrylic esters, and (d) graft copolymers comprising a backbone of a propylene polymer material having a substituted acrylic ester graft polymerized thereto, and (2) about 0.1% to about 5% of at least one unsaturated aliphatic compound having a molecular weight of at least 200 and an iodine number of at least 10, e.g., soybean oil.

24 Claims, 3 Drawing Sheets

RETARDING THE THERMAL DEGRADATION OF POLYMERS USING UNSATURATED ALIPHATIC COMPOUNDS

FIELD OF THE INVENTION

This invention relates to a process for making thermally stable polymers, including graft copolymers comprising a backbone of a propylene polymer material.

BACKGROUND OF THE INVENTION

All polymers, natural or synthetic, generally undergo thermal degradation at high temperatures, both in the presence and in the absence of oxygen. The degree of degradation varies for different polymers and can arise not only from the wide variety of chemical structures, but for a given polymer, from differences in crystallinity, morphology, or the nature and amount of catalyst residue that is present. Degradation of the polymer results not only in increasing melt flow index or color, but also affects the melt processability of the polymers at elevated temperatures and their mechanical properties over time.

One type of polymer that is particularly susceptible to thermal degradation at relatively low temperatures is polymers that are substituted at the alpha-carbon atom such as poly(methacrylates), poly(methacrylonitriles) and poly(alpha-methylstyrene). Of these, poly(methacrylates) and particularly poly(methyl methacrylate) (PMMA) are the most widely used in commercial applications. However, their use is limited by their poor thermal stability at processing temperatures. Copolymerization with a minor amount of non-methacrylate monomer such as methyl acrylate, ethyl acrylate, butyl acrylate or styrene is often required to improve stability for processing in commercial applications. If a comonomer is not used, PMMA could depolymerize readily at high conversion (>95%) above 300° C. However, copolymerization affects the mechanical and molecular properties of PMMA. Depolymerization during processing also raises safety and health concerns due to monomer exposure, and odor associated with the monomer. The free monomer in the polymer can also lead to surface irregularities called splay, as well as odor in the finished product.

U.S. Pat. No. 6,046,273 describes a method for increasing the thermal stability of alpha-substituted acrylate graft copolymers by grafting to the backbone of propylene polymer material monomers comprising (a) an acrylic acid substituted at the alpha-carbon atom by a 1–3 C alkyl group and (b) an ester of an acrylic acid substituted at the alpha-carbon atom by a 1–3 C alkyl group. International Patent Publication WO 00/08078 describes a method for increasing the thermal stability of acrylic-grafted propylene polymers by graft polymerizing in the presence of a 4-vinyl-substituted 5–12 C cyclic 1-alkene, which acts as an end-capping agent.

Polymers that are unsubstituted in the alpha-position such as polyethylene, polypropylene, polystyrene, and polyacrylonitrile, generally degrade by random scission at temperatures higher than those at which depolymerization of alpha-substituted polymers takes place, resulting in rapid loss of molecular weight and mechanical properties. In the presence of oxygen, degradation can also proceed via formation of hydroperoxide species, causing further decomposition.

U.S. Pat. No. 5,914,194 discloses vinylidene chloride compositions having enhanced thermal stability and a decreased tendency to degrade while being extruded by using certain fatty acid derivatives, particularly fatty acid derivatives of castor oil, as a stabilizer in amounts up to about 4.0% by weight, along with up to about 2 weight percent of a plasticizer. Use of at least one aliphatic unsaturated compound, e.g., soybean oil or safflower oil, to stabilize polyolefin compositions against radiation-induced degradation is disclosed in U.S. Pat. No. 6,017,986.

There is still a need for a method to increase the thermal stability of polymers, including graft copolymers of propylene polymer materials, under melt processing conditions, compared with that achievable with methods currently used for this purpose.

SUMMARY OF THE INVENTION

The process of this invention for improving the thermal stability of polymers comprises blending, before melt processing, (1) a polymer selected from the group consisting of (a) olefin polymers, (b) polymers of vinyl-substituted aromatic compounds, (c) polymers of acrylic esters selected from the group consisting of (i) an ester of an acrylic acid substituted at the alpha-carbon atom by a 1–3 C alkyl group, and (ii) a combination of (i) and at least one monomer capable of being polymerized by free radicals, and (d) graft copolymers comprising a backbone of a propylene polymer material having graft polymerized thereto a monomer selected from the group consisting of (i) an ester of an acrylic acid substituted at the alpha-carbon atom by a 1–3 C alkyl group, and (ii) a combination of (i) and at least one monomer capable of being polymerized by free radicals, and (2) about 0.1% to about 5%, based on the weight of the polymer, of at least one aliphatic compound having at least one site of unsaturation, the compound having a molecular weight of at least 200 and an iodine number of at least 10.

Also disclosed is a composition comprising (1) a polymer selected from the group consisting of (a) polymers of vinyl-substituted aromatic compounds, (b) polymers of acrylic esters selected from the group consisting of (i) an ester of an acrylic acid substituted at the alpha-carbon atom by a 1–3 C alkyl group, and (ii) a combination of (i) and at least one monomer capable of being polymerized by free radicals, and (c) graft copolymers comprising a backbone of a propylene polymer material having graft polymerized thereto a monomer selected from the group consisting of (i) an ester of an acrylic acid substituted at the alpha-carbon atom by a 1–3 C alkyl group, and (ii) a combination of (i) and at least one monomer capable of being polymerized by free radicals, and (2) about 0.1% to about 5%, based on the weight of the polymer, of at least one aliphatic compound having at least one site of unsaturation, the compound having a molecular weight of at least 200 and an iodine number of at least 10.

The aliphatic unsaturated compound retards degradation of the polymer during melt processing. The improvement in thermal stability of the polymer is indicated by a lower melt flow rate (MFR), a shifting of the weight loss vs temperature curve generated by thermogravimetric analysis (TGA), towards higher temperatures, and/or lowering of the amount of the residual monomer in pelletized samples.

In all of the figures, sufficient broad molecular weight distribution propylene homopolymer was added to the graft copolymer compositions used to generate the TGA data to adjust the effective add level to 50 parts of polymerized monomers per 100 parts of propylene homopolymer.

Figure 2:
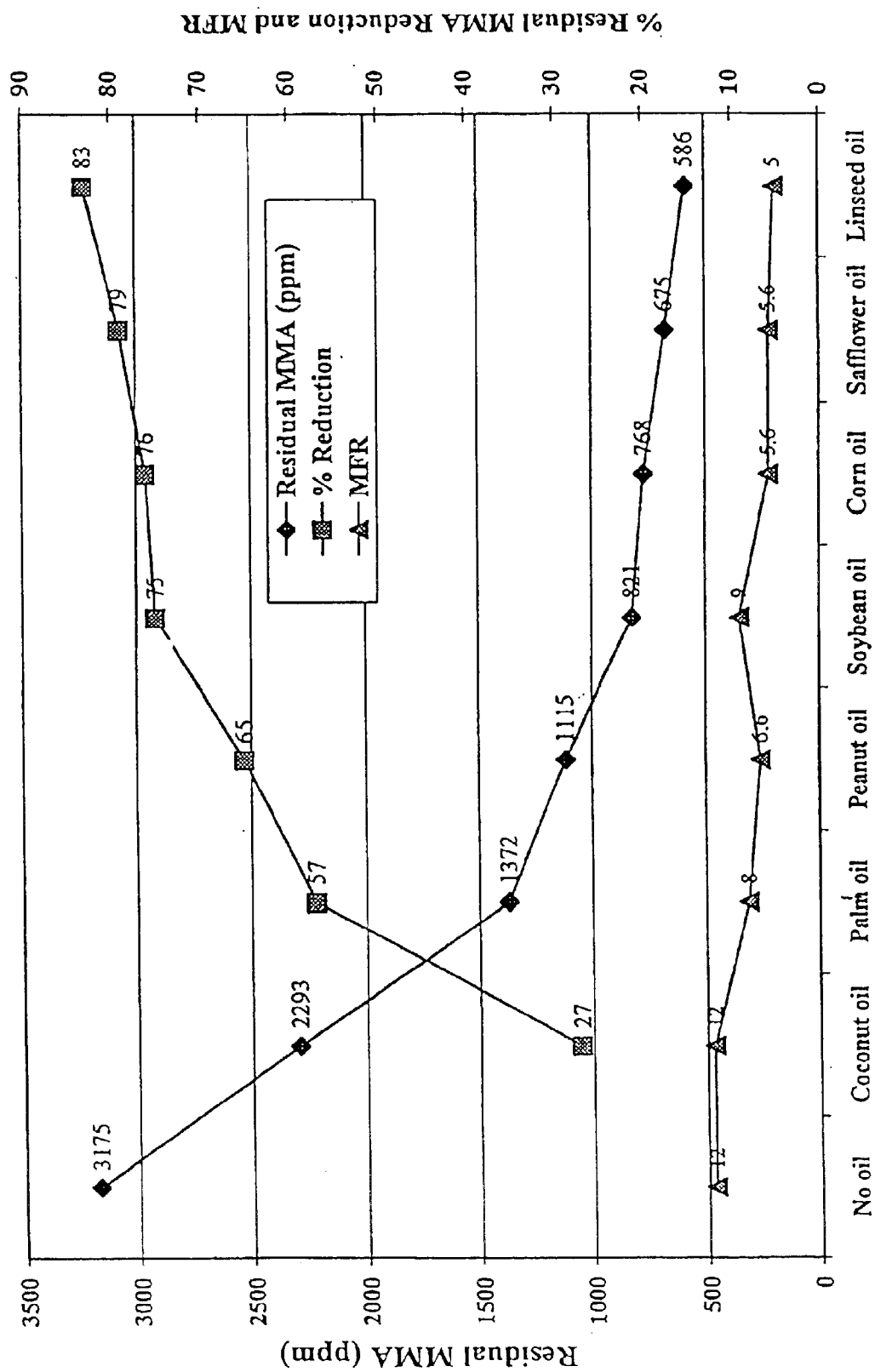

FIG. 2 shows the effect of various oils (2.5 wt. %) on the residual methyl methacrylate concentration (ppm), the % reduction in residual methyl methacrylate, and the MFR of a graft copolymer comprising a backbone of propylene homopolymer, to which was grafted poly(methyl methacrylate-co-methyl acrylate).

Figure 3:
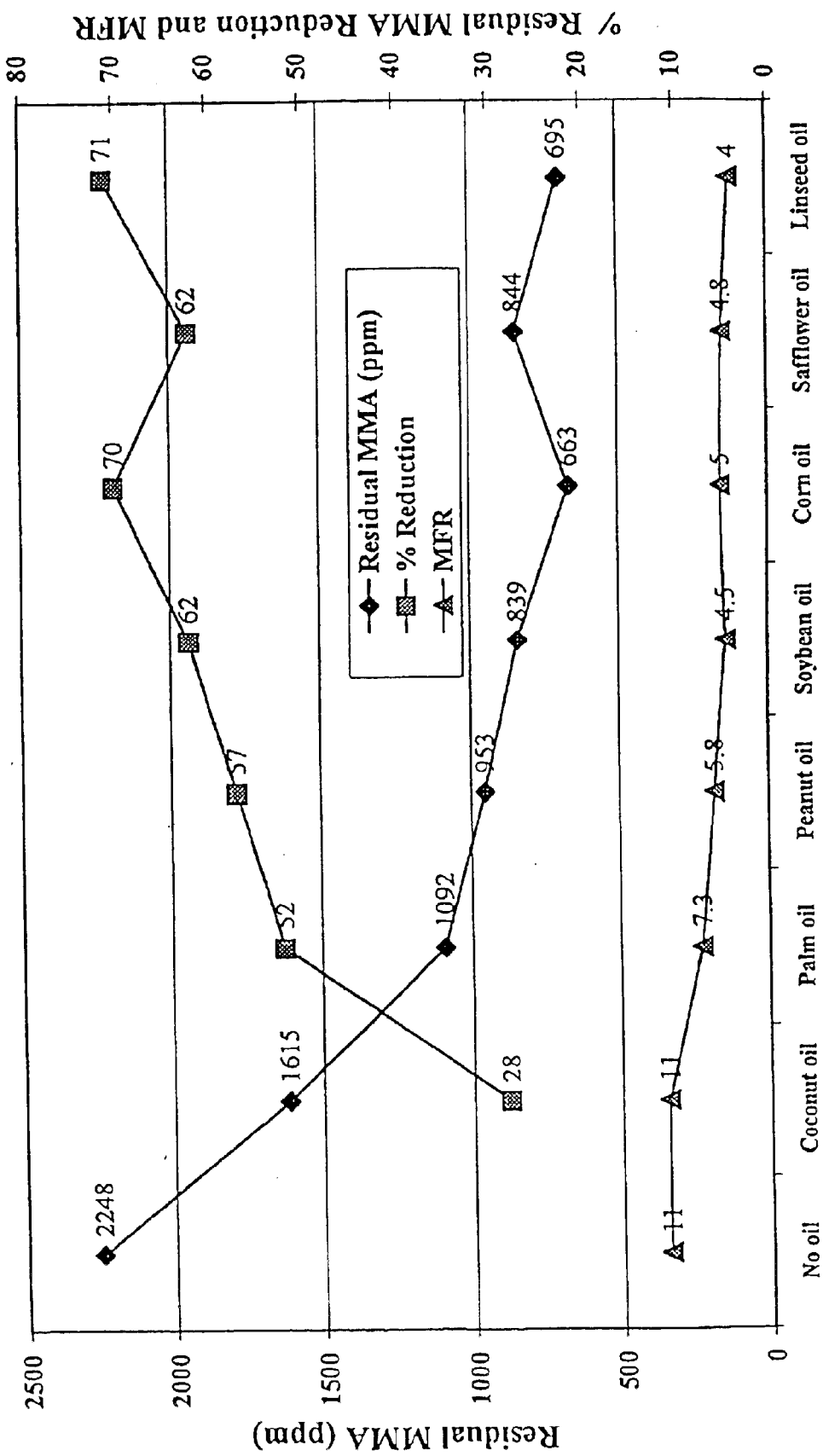

FIG. 3 shows the effect of various oils (2.5 wt. %) on the residual methyl methacrylate concentration (ppm), the % reduction in residual methyl methacrylate, and the MFR of a graft copolymer comprising a backbone of propylene homopolymer, to which was grafted a copolymer of methyl methacrylate and 10% methacrylic acid.

DETAILED DESCRIPTION OF THE INVENTION

The process of this invention for improving the thermal stability of polymers comprises blending, before melt processing, (1) a polymer selected from the group consisting of (a) olefin polymers, (b) polymers of vinyl-substituted aromatic compounds, (c) polymers of acrylic esters selected from the group consisting of (i) an ester of an acrylic acid substituted at the alpha-carbon atom by a 1–3 C alkyl group, and (ii) a combination of (i) and at least one monomer capable of being polymerized by free radicals, and (d) graft copolymers comprising a backbone of a propylene polymer material having graft polymerized thereto a monomer selected from the group consisting of (i) an ester of an acrylic acid substituted at the alpha-carbon atom by a 1–3 C alkyl group, and (ii) a combination of (i) and at least one monomer capable of being polymerized by free radicals, and (2) about 0.1% to about 5%, based on the weight of the polymer, of at least one aliphatic compound having at least one site of unsaturation, the compound having a molecular weight of at least 200 and an iodine number of at least 10, preferably at least 25.

Suitable olefin polymers that can be used in the process of this invention include, for example, polyethylene and polypropylene.

Suitable polymers of vinyl-substituted aromatic compounds include, for example, polymers of styrene, alpha-methylstyrene, para-methylstyrene, and other ring-substituted styrenes.

When the polymer used in the process of this invention is a polymer of an acrylic ester, the ester is an ester of an acrylic acid substituted at the alpha-carbon atom by a 1–3 C alkyl group. Methacrylic acid is the preferred substituted acrylic acid. Suitable esters include, for example, the methyl, ethyl, butyl, benzyl, phenylethyl, epoxypropyl, and hydroxypropyl esters. Esters of 1–4 C alkanols are preferred. Methyl methacrylate is most preferred.

When the acrylic ester is a combination of (i) an ester of an acrylic acid substituted at the alpha-carbon atom by a 1–3 C alkyl group and (ii) at least one monomer capable of being polymerized by free radicals, the monomer capable of being polymerized by free radicals can be any monomeric vinyl compound capable of being polymerized by free radicals where the vinyl radical $H_2C=CR-$, in which $R=H$ or methyl, is attached to a straight or branched aliphatic chain or to a substituted or unsubstituted aromatic, heterocyclic, or alicyclic ring in a mono- or polycyclic compound. Typical substituent groups can be alkyl, hydroxyalkyl, aryl, and halo. Usually the vinyl monomer will be a member of one of the following classes: (1) vinyl-substituted aromatic, heterocyclic, or alicyclic compounds, including styrene, vinylnaphthalene, vinylpyridine, vinylpyrrolidone, vinylcarbazole, and homologs thereof, e.g., alpha- and para-methylstyrene, methylchlorostyrene, p-tert-butylstyrene, methylvinylpyridine, and ethylvinylpyridine; (2) vinyl esters of aromatic and saturated aliphatic carboxylic acids, including vinyl formate, vinyl acetate, vinyl chloroacetate, vinyl cyanoacetate, vinyl propionate, and vinyl benzoate; and (3) unsaturated aliphatic nitriles and carboxylic acids and their derivatives, including acrylonitrile; methacrylonitrile; acrylamide; methacrylamide, and acrylic acid; acrylate esters, such as the methyl, ethyl, hydroxyethyl, 2-ethylhexyl, and butyl acrylate esters; methacrylic acid; ethacrylic acid, and methacrylate esters such as the methyl, ethyl, butyl, benzyl, phenylethyl, phenoxyethyl, epoxypropyl, and hydroxypropyl methacrylate esters. One or more of these monomers can be used.

Olefin polymers, polymers of vinyl-substituted aromatic compounds, and polymers of acrylic esters are all commercially available.

The propylene polymer material that is used as the backbone of the graft copolymer can be:

(a) a crystalline homopolymer of propylene having an isotactic index greater than 80, preferably about 85 to about 99;

(b) a crystalline copolymer of propylene and an olefin selected from the group consisting of ethylene and 4–10 C alpha-olefins, provided that when the olefin is ethylene, the maximum polymerized ethylene content is 10% by weight, preferably about 4%, and when the olefin is a 4–10 C alpha-olefin, the maximum polymerized content thereof is 20%, preferably about 16%, by weight, the copolymer having an isotactic index greater than 85;

(c) a crystalline terpolymer of propylene and two olefins selected from the group consisting of ethylene and 4–8 C alpha-olefins, provided that the maximum polymerized 4–8 C alpha-olefin content is 20% by weight, preferably about 16%, and, when ethylene is one of the olefins, the maximum polymerized ethylene content is 5% by weight, preferably about 4%, the terpolymer having an isotactic index greater than 85;

(d) an olefin polymer composition comprising:

(i) about 10% to about 60% by weight, preferably about 15% to about 55%, of a crystalline propylene homopolymer having an isotactic index greater than 80, preferably about 85 to about 98, or a crystalline copolymer of monomers selected from the group consisting of (a) propylene and ethylene, (b) propylene, ethylene and a 4–8 C alpha-olefin, and (c) propylene and a 4–8 C alpha-olefin, the copolymer having a polymerized propylene content of more than 85% by weight, preferably about 90% to about 99%, and an isotactic index greater than 85;

(ii) about 5% to about 25%, preferably about 5% to about 20%, of a copolymer of ethylene and propylene or a 4–8 C alpha-olefin that is insoluble in xylene at ambient temperature, and (iii) about 30% to about 70%, preferably about 20% to about 65%, of an elastomeric copolymer of monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a diene, and containing less than 70% by weight, preferably about 10% to about 60%, most preferably about 12% to about 55%, of polymerized ethylene and being soluble in xylene at ambient temperature, and having an intrinsic viscosity of about 1.5 to about 4.0 dl/g, wherein the total amount of (ii) and (iii), based on the total olefin polymer composition, is about 50% to about 90%, the weight ratio of (ii)/(iii) is less than 0.4, preferably 0.1 to 0.3, and the composition is prepared by polymerization in at least two stages, and has a flexural modulus of less than 150 MPa; or (e) a thermoplastic olefin comprising:

(i) about 10% to about 60%, preferably about 20% to about 50%, of a crystalline propylene homopolymer having an isotactic index greater than 80, or a crystalline copolymer of monomers selected from the group consisting of (a) ethylene and propylene, (b) ethylene, propylene, and a 4–8 C alpha-olefin, and (c) ethylene and a 4–8 C alpha-olefin, the copolymer having a polymerized propylene content greater than 85% and an isotactic index of greater than 85;

(ii) about 20% to about 60%, preferably about 30% to about 50%, of an amorphous copolymer of monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a diene and containing less than 70% polymerized ethylene and being soluble in xylene at ambient temperature; and (iii) about 3% to about 40%, preferably about 10% to about 20%, of a copolymer of ethylene and propylene or a 4–8 C alpha-olefin that is insoluble in xylene at ambient temperature, wherein the composition has a flexural modulus of greater than 150 but less than 1200 MPa, preferably about 200 to about 1100 MPa, most preferably about 200 to about 1000 MPa.

Room or ambient temperature is ~25° C.

4–8 C Alpha-olefins useful in the preparation of (d) and (e) include, for example, butene-1; pentene-1; hexene-1; 4-methylpentene-1, and octene-1.

The diene, when present, is typically a butadiene; 1,4-hexadiene; 1,5-hexadiene, or ethylidenenorbornene.

Propylene polymer materials (d) and (e) can be prepared by polymerization in at least two stages, where in the first stage the propylene; propylene and ethylene; propylene and an alpha-olefin, or propylene; ethylene and an alpha-olefin are polymerized to form component (i) of (d) or (e), and in the following stages the mixtures of ethylene and propylene; ethylene and the alpha-olefin, or ethylene, propylene and the alpha-olefin, and optionally a diene, are polymerized to form components (ii) and (iii) of (d) or (e).

The polymerization can be conducted in liquid phase, gas phase, or liquid-gas phase using separate reactors, all of which can be done either by batch or continuously. For example, it is possible to carry out the polymerization of component (i) using liquid propylene as a diluent, and the polymerization of components (ii) and (iii) in gas phase, without intermediate stages except for the partial degassing of the propylene. All gas phase is the preferred method.

The preparation of propylene polymer material (d) is described in more detail in U.S. Pat. Nos. 5,212,246 and 5,409,992, which are incorporated herein by reference. The preparation of propylene polymer material (e) is described in more detail in U.S. Pat. Nos. 5,302,454 and 5,409,992, which are incorporated herein by reference.

Propylene homopolymer is the preferred propylene polymer backbone material.

The monomers that can be graft polymerized onto the backbone of propylene polymer material are selected from the group consisting of (i) an ester of an acrylic acid substituted at the alpha-carbon atom by a 1–3 C alkyl group, and (ii) a combination of (i) and at least one monomer capable of being polymerized by free radicals.

One of the monomers that can be graft polymerized onto the backbone of propylene polymer material is an ester of an acrylic acid substituted at the alpha-carbon atom by a 1–3 C alkyl group. Methacrylic acid is the preferred substituted acrylic acid. Suitable esters include, for example, the methyl, ethyl, benzyl, phenylethyl, phenoxyethyl, epoxypropyl, and hydroxypropyl esters. Esters of 1–4 C alkanols are preferred. Methyl methacrylate is most preferred.

When a combination of an ester of a substituted acrylic acid and at least one monomer capable of being polymerized by free radicals is used, the monomer capable of being polymerized by free radicals can be any of the monomeric vinyl compounds described previously in connection with the polymers of acrylic esters.

The preferred combination of an ester of a substituted acrylic acid and a monomer capable of being polymerized by free radicals is a combination of methyl methacrylate and methyl, ethyl, or butyl acrylate; a combination of methyl methacrylate and styrene, or a combination of methyl methacrylate and methacrylic acid.

The total amount of polymerized monomers used to make the graft copolymer is about 20 to about 240 parts, preferably about 30 to about 95 parts, per hundred parts of the propylene polymer material.

The graft copolymer can be made according to any one of various methods. One of these methods involves forming active grafting sites on the propylene polymer material by treatment with a peroxide or other chemical compound that is a free radical polymerization initiator, or by irradiation with high energy ionizing radiation. The free radicals produced in the polymer as a result of the chemical or irradiation treatment form active grafting sites on the polymer and initiate the polymerization of the monomers at these sites.

During the graft polymerization, the monomers also polymerize to form a certain amount of free or ungrafted polymer or copolymer. The morphology of the graft copolymer is such that the propylene polymer material is the continuous or matrix phase, and the polymerized monomers, both grafted and ungrafted, are a dispersed phase.

The last step of the process for making the graft copolymers is removing any unreacted grafting monomer from the resulting grafted propylene polymer material, decomposing any unreacted initiator, and deactivating any residual free radicals in the material.

Preparation of graft copolymers by contacting the propylene polymer with a free radical polymerization initiator such as an organic peroxide and a vinyl monomer is described in more detail in U.S. Pat. No. 5,140,074, which is incorporated herein by reference. Preparation of graft copolymers by irradiating an olefin polymer and then treating with a vinyl monomer is described in more detail in U.S. Pat. No. 5,411,994, which is incorporated herein by reference.

The degree of retardation of polymer degradation was found to depend on the degree of unsaturation of the unsaturated aliphatic compound and its concentration in the formulation. The degree of unsaturation is indicated by the iodine number of the unsaturated compound. A minimum amount of unsaturation (iodine number of 10) is required. A compound having multiple unsaturation sites will typically be more effective than a compound having a single unsaturation site. In general, from about 0.1% to about 5%, preferably about 0.5% to about 2.5%, based on the weight of the polymer, is added. The molecular weight of the unsaturated aliphatic compound is typically at least 200, and preferably at least 350, to avoid volatility problems during extrusion of the polymer.

Suitable unsaturated aliphatic compounds include, for example, fatty oils, squalene, polybutadiene, a tertiary amine having at least one aliphatic, unsaturated substituent derived from a fatty acid, oleamide, calcium oleate, erucyl erucamide, and glycerol monooleate. Many of these compounds are commercially available.

The fatty oils are composed largely of glycerides of the fatty acids, chiefly oleic, palmitic, stearic, and linoleic acids, although they are typically described in terms of their fatty acid content. The presence of free acid in edible oils such as safflower oil is undesirable. Thus, such oils are refined to ensure that there is little or no free acid present.

Soybean oil, safflower oil, and linseed oil are particularly preferred fatty oils for use in the practice of this invention. Soybean oil is a drying oil extracted from soybeans and has an iodine value of 123–140. Safflower oil is a drying oil extracted from safflower (carthamus) seed and has an iodine number of about 145. Linseed oil is a drying oil extracted from flaxseed and has an iodine value of about 180. The oils are readily available and less expensive than adding antioxidants to the polymers or adding comonomers in the case of substituted acrylic acid esters.

Squalene is an aliphatic hydrocarbon having six unconjugated double bonds, has an iodine number of about 310, a molecular weight of 423, and is found in shark liver oil.

The polybutadiene can have significant unsaturation (e.g., an iodine value of about 470) and can contain a variety of cis- and trans-unsaturation. These polymers are commercially available, e.g., a polybutadiene containing 70% 1,2-vinyl double bonds, 20% 1,4-trans vinyl bonds, and 10% 1,4-cis vinyl bonds.

Suitable aliphatic, unsaturated amine compounds include oleamide and erucyl erucamide, in addition to tertiary amines having at least one aliphatic, unsaturated substituent derived from a fatty acid. An example of such a tertiary amine includes a commercially available mixture of compounds having two methyl groups and a mixture of substituents derived from fatty acids comprising about 22% saturated $C_{16}$ and $C_{18}$, 53% oleic acid, 22% linoleic acid and 3% linolenic acid. The mixture has a calculated iodine value of 86.

The improvement in the thermal stability of a given polymer can be confirmed by lower MFR, shifting of weight loss vs temperature curves towards higher temperatures using TGA and/or lowering of the amount of residual monomer in the pelletized samples.

Another embodiment of the invention is a composition comprising (1) a polymer selected from the group consisting of (a) polymers of vinyl-substituted aromatic compounds, (b) polymers of acrylic esters selected from the group consisting of (i) an ester of an acrylic acid substituted at the alpha-carbon atom by a 1–3 C alkyl group, and (ii) a combination of (i) and at least one monomer capable of being polymerized by free radicals, and (c) graft copolymers comprising a backbone of a propylene polymer material having graft polymerized thereto a monomer selected from the group consisting of (i) an ester of an acrylic acid substituted at the alpha-carbon atom by a 1–3 C alkyl group, and (ii) a combination of (i) and at least one monomer capable of being polymerized by free radicals, and (2) about 0.1% to about 5%, based on the weight of the polymer, of at least one aliphatic compound having at least one site of unsaturation, the compound having a molecular weight of at least 200 and an iodine number of at least 10. The polymer components and the unsaturated aliphatic compounds are the same as those described above in relation to the process for improving the thermal stability of the polymers.

The compositions of this invention can easily be impact-modified by the addition of one or more rubber components selected from the group consisting of (i) an olefin copolymer rubber, (ii) a monoalkenyl aromatic hydrocarbon-conjugated diene block copolymer, and (iii) a core-shell rubber. Any of these rubber components can have acid or anhydride functionality or can be free of these functional groups. The preferred rubber components are (i) and (ii), either alone or in combination.

Suitable olefin copolymer rubbers include, for example, saturated olefin copolymer rubbers such as ethylene/propylene monomer rubbers (EPM), ethylene/octene-1, and ethylene/butene-1 rubbers, and unsaturated olefin terpolymer rubbers such as ethylene/propylene/diene monomer rubbers (EPDM). The preferred olefin copolymer rubbers are ethylene/propylene, ethylene/butene-1, and ethylene/octene-1 copolymers.

The monoalkenyl aromatic hydrocarbon-conjugated diene block copolymer can be a thermoplastic elastomer of the A-B (or diblock) structure, the linear A-B-A (or triblock) structure, the radial $(A-B)_n$ type where n=3–20%, or a combination of these structure types, wherein each A block is a monoalkenyl aromatic hydrocarbon polymer block, and each B block is an unsaturated rubber block. Various grades of copolymers of this type are commercially available. The grades differ in structure, molecular weight of the mid and end blocks, and ratio of monoalkenyl aromatic hydrocarbon to rubber. The block copolymer can also be hydrogenated. Typical monoalkenyl aromatic hydrocarbon monomers are styrene, ring-substituted 1–4 C linear or branched alkyl styrenes, and vinyltoluene. Styrene is preferred. Suitable conjugated dienes include, for example, butadiene and isoprene. Preferred block copolymers are hydrogenated styrene/ethylene-butene/styrene triblock copolymers.

The weight average molecular weight $M_w$ of the block copolymers generally will be in the range of about 45,000 to about 260,000 g/mole, average molecular weights in the range of about 50,000 to about 125,000 g/mole being preferred because they produce compositions having the best balance of impact strength and stiffness. Also, while block copolymers having unsaturated as well as saturated rubber blocks can be used, copolymers having saturated rubber blocks are preferred, also on the basis of the impact/stiffness balance of the compositions containing them. The weight ratio of monoalkenyl aromatic hydrocarbon to conjugated diene rubber in the block copolymer is in the range of about 5/95 to about 50/50, preferably about 10/90 to about 40/60.

The core-shell rubber components comprise small particles of crosslinked rubber phase surrounded by a compatibilizing shell, normally a glassy polymer or copolymer. The core is typically a diene rubber such as butadiene or isoprene, or an acrylate. The shell is typically a polymer of two or more monomers selected from styrene, methyl methacrylate, and acrylonitrile. Particularly preferred core-shell rubbers have an acrylate core.

Suitable impact modifiers include, for example, Engage 8100, 8150, and 8200 ethylene/octene-1 copolymers, commercially available from DuPont Dow Elastomers; EPM 306P random ethylene/propylene copolymer, commercially available from Miles Inc., Polysar Rubber Division; Kraton G 1652 styrene/ethylene-butene/styrene triblock copolymer, commercially available from Shell Chemical Company; Exact ethylene/butene-1 copolymers, commercially available from Exxon Chemical, and KSO80 and KS350 heterophasic polyolefins, commercially available from Basell USA Inc.

The impact modifier, if present, is used in an amount of about 2% to about 30%, preferably about 5% to about 15%, by weight, based on the total weight of the composition.

The compositions of this invention can also contain a broad molecular weight distribution ($M_w/M_n$) propylene polymer material (BMWD PP). The BMWD PP has a $M_w/M_n$ of about 5 to about 60, preferably about 5 to about 40; a melt flow rate of about 0.5 to about 50, preferably about 1 to about 30 g/10 min, and xylene insolubles at 25° C. of greater than or equal to 94%, preferably greater than or equal to 96%, and most preferably greater than or equal to 98%. The propylene polymer material having a broad molecular weight distribution can be a homopolymer of propylene or an ethylene/propylene rubber impact-modified homopolymer of propylene, wherein the propylene homopolymer has a broad molecular weight distribution.

The BMWD PP can be prepared by sequential polymerization in at least two stages, in the presence of a Ziegler-Natta catalyst supported on magnesium halide in active form. The polymerization process occurs in separate and consecutive stages, and in each stage polymerization takes place in the presence of the polymer and the catalyst coming from the preceding stage.

The polymerization process can be carried out in a batch or in a continuous mode according to known techniques, operating in liquid phase in the presence or not of an inert diluent, or in gas phase, or liquid-gas phase, preferably in gas phase. The preparation of the BMWD PP is described in more detail in U.S. Pat. No. 5,286,791, which is incorporated herein by reference.

The BMWD PP, if present, is used in an amount of about 5% to about 90%, preferably about 10% to about 70%, based on the total weight of the composition.

Either one or both of the rubber component and the BMWD PP can be added to the composition.

The polymer compositions can also include other additives that are conventionally employed in the art, such as pigments, slip agents, waxes, antiblocking agents, and antioxidants.

The melt flow rate of the graft copolymers is measured according to ASTM 1238 at 230° C. and 3.8 kg. The melt flow rate of propylene polymers is measured according to ASTM 1238 at 230° C. and 2.16 kg.

The porosity of the propylene homopolymer used as the backbone polymer in the manufacture of the graft copolymers is measured as described in Winslow, N. M. and Shapiro, J. J., "An Instrument for the Measurement of Pore-Size Distribution by Mercury Penetration," ASTM Bull., TP 49, 39–44 (February 1959), and Rootare, H. M., "Review of Mercury Porosimetry," 225–252 (In Hirshhom, J. S. and Roll, K. H., Eds., *Advanced Experimental Techniques in Powder Metallurgy,* Plenum Press, New York, 1970).

Isotactic index is defined as the xylene insoluble fraction. The weight percent of olefin polymer soluble in xylene at room temperature is determined by dissolving 2.5 g of the polymer in 250 ml of xylene in a vessel equipped with a stirrer, that is heated at 135° C. with agitation for 20 minutes. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached. The percent by weight of polymer insoluble in xylene at room temperature is the isotactic index of the polymer. The value obtained in this manner corresponds substantially to the isotactic index determined via extraction with boiling n-heptane, which by definition constitutes the isotactic index of the polymer.

Intrinsic viscosity was measured in decahydronaphthalene at 135° C.

Molecular weight measurements were made by gel permeation chromatography.

Polydispersity index (PI) is defined as the inverse of the cross-over modulus obtained from a frequency scan as described in G. R. Zeichner and P. D. Patel, "A Comprehensive Evaluation of Polypropylene Melt Rheology", Proc. $2^{nd}$ World Cong. On Chem. Eng., Vol. 6, p. 333, Montreal, 1981.

Residual methyl methacrylate (MMA) was determined by gel permeation chromatography (GPC) using acetone ultrasonic extraction.

In this specification all parts and percentages are by weight unless otherwise noted.

EXAMPLE 1

This example describes the effect of soybean oil on the thermal stability of a graft copolymer comprising a propylene homopolymer backbone, to which was grafted a methyl methacrylate copolymer. The graft copolymers are designated as PP-g-(MMA-co-MeAc) and PP-g-(MMA-co-MAA) in Table 1.

In this and the following examples the propylene homopolymer used as the backbone polymer had the following properties: spherical form, a MFR of 9 g/10 min, a porosity of 0.45 cm$^3$/g and a $M_w$ of 170,000.

The monomers were grafted onto the propylene homopolymer backbone at a grafting temperature of 115° C. using the previously described peroxide-initiated graft polymerization process. Ninety-five parts by weight of monomers were added per 100 parts of propylene homopolymer. For the methyl methacrylate/methyl acrylate copolymer (MMA-co-MeAc), the methyl acrylate was 4.4% by weight of the total monomers. For the methyl methacrylate/methacrylic acid copolymer (MMA-co-MAA), methacrylic acid was 5% of the total monomers. Lupersol PMS 50% t-butyl peroxy-2-ethyl hexanoate in mineral spirits, commercially available from Elf Atochem, was used as the peroxide initiator. The monomers were fed at a rate of 1 pph/min. A monomer to initiator molar ratio of 120 was used. After the grafting reaction was complete, the temperature was raised to 140° C. for 2 hours under a nitrogen purge.

The soybean oil was added to the graft copolymer and a broad molecular weight distribution propylene homopolymer (BMWD PP), and the mixture was allowed to stand overnight. Calcium stearate and the Irganox B-225 antioxidant were then added. The BMWD PP was added to adjust the effective add level to 50 parts of polymerized monomers per hundred parts of propylene homopolymer. It had a polydispersity index of 7.4, a MFR of 1 g/10 min, and xylene solubles at room temperature of 1.5%, and is commercially available from Basell USA Inc. The amounts of graft copolymer, BMWD PP, soybean oil, calcium stearate, and antioxidant are shown in Table 1. Irganox B-225 antioxidant is a blend of 1 part Irganox 1010 antioxidant and 1 part Irgafos 168 tris(2,4-di-t-butylphenyl) phosphite antioxidant, commercially available from Ciba Specialty Chemicals Corporation. All amounts in Table 1 are given in weight per cent unless otherwise noted. Residual MMA is given in parts per million parts of the total composition.

The blends were homogenized prior to compounding to disperse the oil, either by hand shaking or tumble blending, and then extruded on a Leistritz 34 mm twin screw extruder at 230° C. at a feed rate of 20 lb/hr and a screw speed of 300 rpm.

Figure 1:
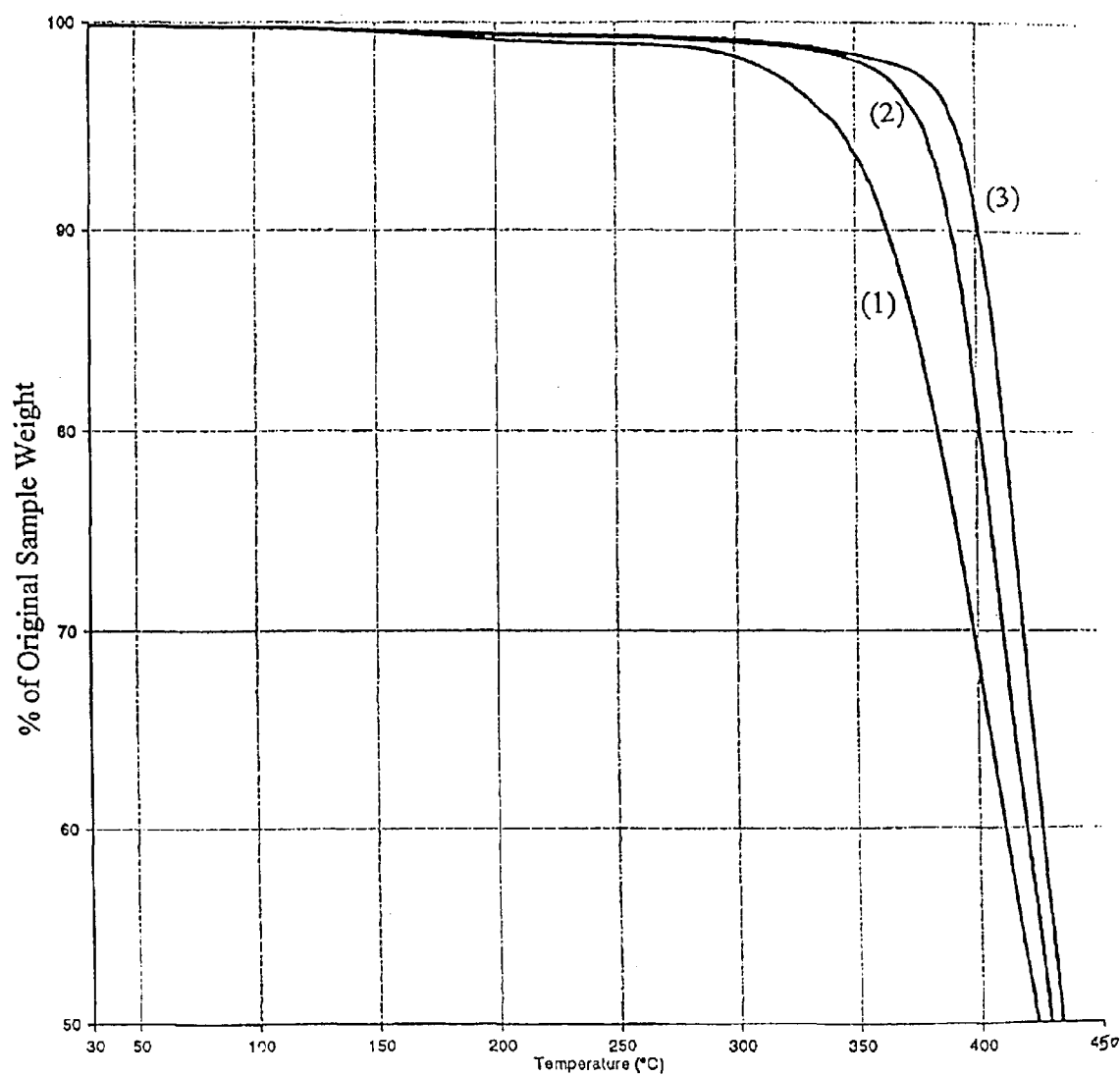
FIG. 1 is a plot of temperature (° C.) against the % of the original weight of the grafted polymer and shows the weight loss during TGA and therefore the thermal stability of (1) a graft copolymer comprising a backbone of propylene homopolymer, to which was grafted poly(methyl methacrylate-co-methyl acrylate) without the unsaturated additive, (2) a graft copolymer comprising a backbone of propylene homopolymer, to which was grafted a copolymer of methyl methacrylate and methyl acrylate, blended with 5% soybean oil, and (3) a graft copolymer comprising a backbone of propylene homopolymer, to which was grafted a copolymer of methyl methacrylate and 5% methacrylic acid, blended with 5% soybean oil.

The thermal stability of the pelletized samples was assessed by TGA using a Perkin-Elmer TGA-7 analyzer. About 7.5 mg of sample was scanned at 10° C./min in nitrogen from 30° C. to 900° C. and the weight loss was monitored. The weight loss/temperature curve of selected samples is shown in FIG. 1 and numerically represented in Table 2.

TABLE 1

| Sample | Control 1 | 1 | 2 | Control 2 | 3 | 4 |
|---|---|---|---|---|---|---|
| PP-g-(MMA-co-MeAc) | 67.7 | 66.0 | 64.3 | | | |
| PP-g-(MMA-co-MAA) | | | | 67.7 | 66.0 | 64.3 |
| BMWD PP | 31.8 | 31.0 | 30.2 | 31.8 | 31.0 | 30.2 |
| Soybean oil | 0.0 | 2.5 | 5.0 | 0.0 | 2.5 | 5.0 |
| Calcium stearate | 0.1 | 0.1 | 0.1 | 0.1 | 0.1 | 0.1 |
| Antioxidant | 0.4 | 0.4 | 0.4 | 0.4 | 0.4 | 0.4 |
| MFR (230° C., 3.8 kg) (g/10 min) | 12.0 | 8.2 | 8.0 | 14.8 | 7.2 | 7.8 |
| Residual MMA (ppm) | 2938 | 937 | 601 | 2071 | 904 | 858 |

TABLE 1-continued

| Sample | Control 1 | 1 | 2 | Control 2 | 3 | 4 |
|---|---|---|---|---|---|---|
| Residual MMA reduction (%) | — | 68 | 79 | — | 56 | 58 |

TABLE 2

| | Temperature (° C.) | | |
|---|---|---|---|
| | PP-g-(MMA-co-MeAc), No oil | PP-g-(MMA-co-MeAc), 5% Soybean oil | PP-g-(MMA-co-MAA), 5% Soybean oil |
| 1% Weight loss | 280 | 337 | 342 |
| 2% Weight loss | 311 | 359 | 367 |
| 3% Weight loss | 325 | 367.5 | 381.2 |
| 4% Weight loss | 335 | 373.8 | 387.5 |
| 5% Weight loss | 342.5 | 379 | 391 |
| 10% Weight loss | 364 | 390 | 401 |

The improvement in the thermal stability when soybean oil was present was confirmed by the lowering of the MFR of the pelletized samples, by a lower residual MMA level in the compounded samples, and by weight loss at relatively higher temperatures by TGA.

EXAMPLE 2

Graft copolymers comprising a backbone of propylene homopolymer, to which were grafted (MMA-co-MeAc) and (MM-co-MAA) were prepared as described in Example 1, except that 10% MAA was used instead of 5%. The components of the compositions were combined as described in Example 1. The same BMWD PP was used as in Example 1 and was added to adjust the effective add level to 50 parts of polymerized monomers per hundred parts of propylene homopolymer. The amounts of graft copolymer, BMWD PP, soybean oil, calcium stearate, and the antioxidant are shown in Table 3. The BMWD PP and the antioxidant are the same as in Example 1. All amounts are given in weight percent unless otherwise noted.

The blends were homogenized prior to compounding to disperse the oil and were then extruded as described in Example 1.

TABLE 3

| Sample | Control 1 | 1 | 2 | 3 | Control 2 | 4 | 5 | 6 |
|---|---|---|---|---|---|---|---|---|
| PP-g-(MMA-co-MeAc) | 67.70 | 67.36 | 67.00 | 66.70 | | | | |
| PP-g-(MMA-co-MAA) | | | | | 67.70 | 67.36 | 67.00 | 66.70 |
| BMWD PP | 31.80 | 31.60 | 31.50 | 31.30 | 31.80 | 31.60 | 31.50 | 31.30 |

TABLE 3-continued

| Sample | Control 1 | 1 | 2 | 3 | Control 2 | 4 | 5 | 6 |
|---|---|---|---|---|---|---|---|---|
| Soybean oil | 0.00 | 0.50 | 1.00 | 1.50 | 0.00 | 0.50 | 1.00 | 1.50 |
| Calcium stearate | 0.10 | 0.10 | 0.10 | 0.10 | 0.10 | 0.10 | 0.10 | 0.10 |
| Antioxidant | 0.40 | 0.40 | 0.40 | 0.40 | 0.40 | 0.40 | 0.40 | 0.40 |
| MFR (230° C., 3.8 kg) (g/10 min) | 21.2 | 19.6 | 18.0 | 15.2 | 13.2 | 13.2 | 10.0 | 11.2 |
| Residual MMA (ppm) | 3739.0 | 2094.0 | 1256.0 | 977.0 | 1384.0 | 948.0 | 724.0 | 591.0 |
| Residual MMA reduction (%) | — | 44.0 | 66.0 | 74.0 | — | 32.0 | 48.0 | 57.0 |

Residual MMA reduction was realized at 0.5, 1.0, and 1.5% oil. The MFRs were also lower than the respective control samples without the oil.

EXAMPLE 3

This example demonstrates the effectiveness of various oils in controlling the degradation of graft copolymers comprising a propylene homopolymer backbone, to which were grafted two different methyl methacrylate copolymers. The oils selected and their iodine numbers are given in Table 4.

TABLE 4

| Oil (2.5%) | Iodine Number | Ranking (high to low) |
|---|---|---|
| Linseed oil | 180 | 1 |
| Safflower oil | 145 | 2 |
| Soybean oil | 123–140 | 3 |
| Corn oil | 123 | 4 |
| Peanut oil | 90 | 5 |
| Palm oil | 50 | 6 |
| Coconut oil | 10 | 7 |

The effect of these oils on the MFR and the residual MMA concentration are represented in FIGS. 2 and 3. The graft copolymer tested in FIG. 2 had a backbone of propylene homopolymer to which was grafted a methyl methacrylate/methyl acrylate copolymer, wherein the amount of methyl acrylate was 4.4% of the total monomers. The graft copolymer tested in FIG. 3 had a backbone of propylene homopolymer, to which was grafted a methyl methacrylate/methacrylic acid copolymer, wherein the amount of methacrylic acid was 5% of the total monomers. Both graft copolymers were prepared as described in Example 1. In each case 2.5% of the oil was used.

It is evident from these data that oils having a higher degree of unsaturation, i.e., a higher iodine number, were more effective in retarding the degradation of the poly(methyl methacrylate) (PMMA) in the graft copolymer.

EXAMPLE 4

This example shows the effect of soybean oil on the stability of polystyrene as determined by TGA. The polystyrene had a $M_w$ of 280,000 and is commercially available from Aldrich Chemical Company.

The polystyrene was first ground and then mixed with 2.5% soybean oil. The data from the weight loss/temperature curve obtained by TGA are given in Table 5.

TABLE 5

| Weight loss (wt. %) | Polystyrene, No oil | Polystyrene + 2.5% Soybean oil |
|---|---|---|
| 1 | 352° C. | 372° C. |
| 2 | 379° C. | 394° C. |
| 4 | 391° C. | 407° C. |
| 6 | 398° C. | 413° C. |
| 8 | 402° C. | 417° C. |
| 10 | 409° C. | 427° C. |

In the presence of the soybean oil, any given % weight loss occurred at a higher temperature than without the soybean oil being present.

EXAMPLE 5

This example shows the effect of soybean oil on the degradation of alpha-methylstyrene, which is less thermally stable than polystyrene because of substitution by the methyl group in the alpha position of the phenyl ring. The poly(alpha-methylstyrene) had a $M_w$ of 113,000 and is commercially available from Aldrich Chemical Company.

The poly(alpha-methylstyrene) was first ground and then mixed with 2.5% soybean oil. The data from the weight loss/temperature curve obtained by TGA are given in Table 6.

TABLE 6

| Weight loss (wt. %) | Poly(α-methylstyrene), No oil | Poly(α-methylstyrene) + 2.5% Soybean oil |
|---|---|---|
| 1 | 235° C. | 245° C. |
| 2 | 257° C. | 273° C. |
| 3 | 270° C. | 295° C. |
| 4 | 281° C. | 299° C. |
| 5 | 289° C. | 303° C. |
| 10 | 307° C. | 315° C. |

In the presence of the soybean oil, any given % weight loss occurred at a higher temperature than without the soybean oil being present.

EXAMPLE 6

This example shows the effect of soybean oil on the degradation of a graft copolymer having a backbone of propylene homopolymer, to which polystyrene was graft polymerized (PP-g-PS).

The propylene homopolymer used as the backbone of the graft copolymer was the same as in Example 1. The monomers were grafted onto the propylene homopolymer backbone at a grafting temperature of 120° C. using the previously described peroxide-initiated graft polymerization process. Eighty-five parts by weight of styrene were added per 100 parts of propylene homopolymer. Lupersol PMS 50% t-butylperoxy-2-ethyl hexanoate in mineral spirits, commercially available from Elf Atochem, was used as the peroxide initiator. The monomer was fed at 1.0 pph/min, and a monomer to initiator molar ratio of 105 was used. After completion of monomer and peroxide addition, the temperature was raised to 140° C. for 60 minutes under a nitrogen purge.

Four different samples were extruded on a 34 mm Leistritz twin screw extruder with and without 2.5% soybean oil and 0.2% Irganox B-225 antioxidant at a barrel temperature of 280° C., 300 rpm, and a throughput rate of 20 lb/hr. The MFR of the samples after compounding is shown in Table 7.

TABLE 7

| Sample | 1 | 2 | 3 | 4 |
|---|---|---|---|---|
| PP-g-PS | Yes | Yes | Yes | Yes |
| Antioxidant | No | Yes | No | Yes |
| Soybean oil | No | No | Yes | Yes |
| MFR (230° C., 3.8 kg) (g/10 min) | 64 | 70 | 28.8 | 18.8 |

The weight loss/temperature data from TGA are numerically represented in Table 8.

TABLE 8

| Weight loss (wt. %) | PP-g-PS + Irganox B-225, No oil | PP-g-PS + 2.5% Soybean oil + Irganox B-225 |
|---|---|---|
| 1 | 348° C. | 382° C. |
| 2 | 377° C. | 402° C. |
| 4 | 393° C. | 417° C. |
| 6 | 402° C. | 421° C. |
| 8 | 408° C. | 424° C. |
| 10 | 411° C. | 427° C. |

The presence of the soybean oil resulted in a drop in MFR from 64 to 28.8 dg/min without stabilizer and from 70 to 18.8 dg/min with stabilizer. In addition, the weight loss vs temperature curve from TGA shifted towards higher temperatures.

EXAMPLE 7

This example shows the effect of soybean oil on the thermal stability of propylene homopolymer (PP) using TGA. The propylene homopolymer used as the backbone polymer in Example 1 was mixed with 2.5% soybean oil. Propylene homopolymer without oil was used as a control and the temperatures at which polymer weight loss occurred were compared. The results are given in Table 9.

TABLE 9

| Weight Loss (wt. %) | PP, No oil | PP + 2.5% Soybean oil |
|---|---|---|
| 1 | 363° C. | 391° C. |
| 2 | 385° C. | 408° C. |
| 4 | 411° C. | 423° C. |
| 6 | 426° C. | 430° C. |
| 8 | 435° C. | 435° C. |

The temperature at which the propylene homopolymer lost up to 6% by weight shifted upwards in the presence of soybean oil.

EXAMPLE 8

This example shows the effect of soybean oil on the thermal stability of poly(methyl methacrylate) (PMMA) using TGA. The poly(methyl methacrylate) was Plexiglas VS, commercially available from Rohm & Haas, having a $M_w$ of 82,700.

The formulations containing PMMA, calcium stearate, and Irganox B-225 antioxidant, with and without 1% by weight of linseed oil, were extruded on a Leistritz twin screw extruder at a barrel temperature of 230° C., 300 rpm, and a throughput of 20 lb/hr. The amounts of each component, the MFR, the amount of residual MMA by GPC, and the % reduction in residual MMA are given in Table 10. All amounts are given in weight % unless otherwise noted. The weight loss/temperature data from TGA are numerically represented in Table 11.

TABLE 10

| Sample | Control | 1 |
|---|---|---|
| PMMA | 99.5 | 98.5 |
| Linseed oil | 0 | 1 |
| Calcium stearate | 0.1 | 0.1 |
| Antioxidant | 0.4 | 0.4 |
| MFR (230° C., 3.8 kg) (g/10 min) | 30 | 34 |
| MFR (230° C., 2.16 kg) (g/10 min) | 15 | 16 |
| Residual MMA (ppm) | 643 | 227 |
| Residual MMA reduction (%) | — | 65 |

TABLE 11

| | Temperature (° C.) | |
|---|---|---|
| Weight loss (%) | PMMA, No oil | PMMA + 1% Linseed oil |
| 1 | 303.6 | 324.7 |
| 5 | 343.2 | 351 |
| 10 | 356.3 | 356.5 |
| 25 | 375 | 382.4 |

EXAMPLE 9

The graft copolymer consisted of a propylene homopolymer backbone to which was grafted a MMA/MeAc copolymer and was prepared as described in Example 1. The components of the compositions were combined as described in Example 1. The BMWD PP was the same as in Example 1 and was added to adjust the effective add level to 70 parts of polymerized monomers per hundred parts of propylene homopolymer. The amounts of graft copolymer, BMWD PP, rubber, UV stabilizer masterbatch, and soybean oil are given in Table 12. All amounts in Table 12 are in parts by weight unless otherwise noted.

The rubber component was Engage 8150 polyolefin elastomer and is a copolymer of ethylene and octene containing 25% octene, commercially available from Du Pont-Dow Elastomers. The UV stabilizer masterbatch contained 0.05% by weight Pationic 1240 modified calcium salt derived from lactic acid, commercially available from Patco Polymer Additives Division, American Ingredients Company; 0.10% Irganox 1010 antioxidant; 0.10% Irgafos 12 phosphite antioxidant; 0.30% Tinuvin 328 antioxidant, which is 2-(2-hydroxy-3,5-di-tert-amylphenyl-2H-benzotriazole; 0.25% Tinuvin 770 antioxidant, which is bis(2,2,6,6-tetramethyl-4-piperidinyl)sebacate, and 0.25% Chimassorb 119 antioxidant, all commercially available from Ciba Specialty Chemicals Corporation.

The samples were homogenized prior to compounding to disperse the oil and then compounded on a 40 mm co-rotating, intermeshing Werner-Pfleiderer twin screw extruder at a temperature of 210°–270° C., 475–500 RPM, and a through-put rate of 110–170 lb/hr. Each sample was extruded as pellets.

TABLE 12

| Sample | Control 1 | 1 | Control 2 | 2 | Control 3 | 3 |
|---|---|---|---|---|---|---|
| PP-g-(MMA-co-MeAc) | 79.41 | 77.29 | 79.41 | 77.29 | 79.41 | 77.29 |
| BMWD PP | 14.54 | 14.16 | 14.54 | 14.16 | 15.54 | 14.16 |
| Rubber | 5 | 5 | 5 | 5 | 5 | 5 |
| Stabilizer | 1.05 | 1.05 | 1.05 | 1.05 | 1.05 | 1.05 |
| Soybean oil | — | 2.5 | — | 2.5 | — | 2.5 |
| MFR (230° C., 3.8 kg) (g/10 min) | 8.8 | 4.8 | 14.8 | 8.4 | 23.2 | 13.2 |
| Residual MMA (ppm) | 5082 | 1492 | 5485 | 1112 | 6407 | 2294 |
| Residual MMA reduction (%) | — | 70 | — | 79 | — | 64 |

The improvement in the thermal stability when soybean oil was present was confirmed by the lowering of the MFR of the pelletized samples and by a lower residual MMA level in the compounded samples.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A process for improving the thermal stability of polymers comprising blending, before melt processing, (1) a polymer selected from the group consisting of (a) polymers of vinyl-substituted aromatic compounds, (b) polymers of acrylic esters selected from the group consisting of (i) an ester of an acrylic acid substituted at the alpha-carbon atom by a 1–3 C alkyl group, and (ii) a combination of (i) and at least one monomer capable of being polymerized by free radicals, and (c) graft copolymers comprising a backbone of a propylene polymer material having graft polymerized thereto a monomer selected from the group consisting of (i) an ester of an acrylic acid substituted at the alpha-carbon atom by a 1–3 C alkyl group, and (ii) a combination of (i) and at least one monomer capable of being polymerized by free radicals, and (2) about 0.1% to about 5%, based on the weight of the polymer, of at least one aliphatic compound having at least one site of unsaturation, the compound having a molecular weight of at least 200 and an iodine number of at least 10.

2. The process of claim 1 wherein the vinyl-substituted aromatic compound is selected from the group consisting of (a) styrene, (b) alpha-methylstyrene, and (c) ring-substituted styrenes.

3. The process of claim 1 wherein the polymer of an acrylic ester is poly(methyl methacrylate).

4. The process of claim 1 wherein the propylene polymer material backbone of the graft copolymer is selected from the group consisting of:

(a) a crystalline homopolymer of propylene having an isotactic index greater than 80;

(b) a crystalline copolymer of propylene and an olefin selected from the group consisting of ethylene and 4–10 C alpha-olefins, provided that when the olefin is ethylene, the maximum polymerized ethylene content is 10% by weight, and when the olefin is a 4–10 C alpha-olefin, the maximum polymerized content thereof is 20%, the copolymer having an isotactic index greater than 85;

(c) a crystalline terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;

(d) an olefin polymer composition comprising:

(i) about 10% to about 60% by weight of a crystalline propylene homopolymer having an isotactic index greater than 80, or a crystalline copolymer of monomers selected from the group consisting of (a) propylene and ethylene, (b) propylene, ethylene and a 4–8 C alpha-olefin, and (c) propylene and a 4–8 C alpha-olefin, the copolymer having a polymerized propylene content of more than 85% by weight, and an isotactic index greater than 85;

(ii) about 5% to about 25% of a copolymer of ethylene and propylene or a 4–8 C alpha-olefin that is insoluble in xylene at ambient temperature, and (iii) about 30% to about 70% of an elastomeric copolymer of monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a diene, and containing less than 70% by weight of polymerized ethylene and being soluble in xylene at ambient temperature, and having an intrinsic viscosity of about 1.5 to about 4.0 dl/g, wherein the total amount of (ii) and (iii), based on the total olefin polymer composition, is about 50% to about 90%, the weight ratio of (ii)/(iii) is less than 0.4, and the composition is prepared by polymerization in at least two stages, and has a flexural modulus of less than 150 MPa; and (e) a thermoplastic olefin comprising:
  (i) about 10% to about 60% of a crystalline propylene homopolymer having an isotactic index greater than 80, or a crystalline copolymer of monomers selected from the group consisting of (a) ethylene and propylene, (b) ethylene, propylene, and a 4–8 C alpha-olefin, and (c) ethylene and a 4–8 C alpha-olefin, the copolymer having a polymerized propylene content greater than 85% and an isotactic index of greater than 85;
  (ii) about 20% to about 60% of an amorphous copolymer of monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a diene and containing less than 70% polymerized ethylene and being soluble in xylene at ambient temperature; and
  (iii) about 3% to about 40% of a copolymer of ethylene and propylene or a 4–8 C alpha-olefin that is insoluble in xylene at ambient temperature,
wherein the composition has a flexural modulus of greater than 150 but less than 1200 MPa.

5. The process of claim 4 wherein the propylene polymer material is a propylene homopolymer.

6. The process of claim 1 wherein the monomers graft polymerized to the backbone of propylene polymer material are methyl methacrylate and methyl acrylate.

7. The process of claim 1 wherein the monomers graft polymerized to the backbone of propylene polymer material are methyl methacrylate and methacrylic acid.

8. The process of claim 1 wherein the monomers graft polymerized to the backbone of propylene polymer material are methyl methacrylate and styrene.

9. The process of claim 1 wherein the unsaturated aliphatic compound is selected from the group consisting of fatty oils, squalene, polybutadiene, and unsaturated aliphatic amine compounds.

10. The process of claim 9 wherein the fatty oil is selected from the group consisting of (a) soybean oil, (b) safflower oil, and (c) linseed oil.

11. The product produced by the process of claim 1.

12. A composition comprising (1) a polymer selected from the group consisting of (a) polymers of vinyl-substituted aromatic compounds, (b) polymers of acrylic esters selected from the group consisting of (i) an ester of an acrylic acid substituted at the alpha-carbon atom by a 1–3 C alkyl group, and (ii) a combination of (i) and at least one monomer capable of being polymerized by free radicals, and (c) graft copolymers comprising a backbone of a propylene polymer material having graft polymerized thereto a monomer selected from the group consisting of (i) an ester of an acrylic acid substituted at the alpha-carbon atom by a 1–3 C alkyl group, and (ii) a combination of (i) and at least one monomer capable of being polymerized by free radicals, and (2) about 0.1% to about 5%, based on the weight of the polymer, of at least one aliphatic compound having at least one site of unsaturation, the compound having a molecular weight of at least 200 and an iodine number of at least 10.

13. The composition of claim 12 wherein the vinyl-substituted aromatic compound is selected from the group consisting of (a) styrene, (b) alpha-methylstyrene, and (c) ring-substituted styrenes.

14. The composition of claim 12 wherein the polymer of an acrylic ester is poly(methyl methacrylate).

15. The composition of claim 12 wherein the propylene polymer material backbone of the graft copolymer is selected from the group consisting of:

(a) a crystalline homopolymer of propylene having an isotactic index greater than 80;
(b) a crystalline copolymer of propylene and an olefin selected from the group consisting of ethylene and 4–10 C alpha-olefins, provided that when the olefin is ethylene, the maximum polymerized ethylene content is 10% by weight, and when the olefin is a 4–10 C alpha-olefin, the maximum polymerized content thereof is 20%, the copolymer having an isotactic index greater than 85;
(c) a crystalline terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;
(d) an olefin polymer composition comprising:
  (i) about 10% to about 60% by weight of a crystalline propylene homopolymer having an isotactic index greater than 80, or a crystalline copolymer of monomers selected from the group consisting of (a) propylene and ethylene, (b) propylene, ethylene and a 4–8 C alpha-olefin, and (c) propylene and a 4–8 C alpha-olefin, the copolymer having a polymerized propylene content of more than 85% by weight, and an isotactic index greater than 85;
  (ii) about 5% to about 25% of a copolymer of ethylene and propylene or a 4–8 C alpha-olefin that is insoluble in xylene at ambient temperature, and
  (iii) about 30% to about 70% of an elastomeric copolymer of monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a diene, and containing less than 70% by weight of polymerized ethylene and being soluble in xylene at ambient temperature, and having an intrinsic viscosity of about 1.5 to about 4.0 dl/g,
wherein the total amount of (ii) and (iii), based on the total olefin polymer composition, is about 50% to about 90%, the weight ratio of (ii)/(iii) is less than 0.4, and the composition is prepared by polymerization in at least two stages, and has a flexural modulus of less than 150 MPa; and
(e) a thermoplastic olefin comprising:
  (i) about 10% to about 60% of a crystalline propylene homopolymer having an isotactic index greater than 80, or a crystalline copolymer of monomers selected from the group consisting of (a) ethylene and propylene, (b) ethylene, propylene, and a 4–8 C alpha-olefin, and (c) ethylene and a 4–8 C alpha-olefin, the copolymer having a polymerized propylene content greater than 85% and an isotactic index of greater than 85;
  (ii) about 20% to about 60% of an amorphous copolymer of monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a diene and containing less than 70% polymerized ethylene and being soluble in xylene at ambient temperature; and
  (iii) about 3% to about 40% of a copolymer of ethylene and propylene or a 4–8 C alpha-olefin that is insoluble in xylene at ambient temperature,
wherein the composition has a flexural modulus of greater than 150 but less than 1200 MPa.

16. The composition of claim 15 wherein the propylene polymer material is a propylene homopolymer.

17. The composition of claim 12 wherein the monomers graft polymerized to the backbone of propylene polymer material are methyl methacrylate and methyl acrylate.

18. The composition of claim 12 wherein the monomers graft polymerized to the backbone of propylene polymer material are methyl methacrylate and methacrylic acid.

19. The composition of claim 12 wherein the monomers graft polymerized to the backbone of propylene polymer material are methyl methacrylate and styrene.

20. The composition of claim 12 wherein the unsaturated aliphatic compound is selected from the group consisting of fatty oils, squalene, polybutadiene, and unsaturated aliphatic amine compounds.

21. The composition of claim 20 wherein the fatty oil is selected from the group consisting of (a) soybean oil, (b) safflower oil, and (c) linseed oil.

22. The composition of claim 12 which further comprises from about 2% to about 30%, based on the total weight of the composition, of one or more rubber components selected from the group consisting of (a) an olefin copolymer rubber, (b) a monoalkenyl aromatic hydrocarbon-conjugated diene block copolymer, and (c) a core-shell rubber.

23. The composition of claim 12 which further comprises from about 5% to about 90%, based on the total weight of the composition, of a broad molecular weight distribution propylene polymer material having a $M_w/M_n$ of about 5 to about 60 and a melt flow rate of about 0.5 to about 50 g/10 min.

24. The composition of claim 22 which further comprises from about 5% to about 90%, based on the total weight of the composition, of a broad molecular weight distribution propylene polymer material having a $M_w/M_n$ of about 5 to about 60 and a melt flow rate of about 0.5 to about 50 g/10 min.

* * * * *